United States Patent [19]

Grall

[11] Patent Number: 4,775,047
[45] Date of Patent: Oct. 4, 1988

[54] DECLINE BELT CONVEYOR

[75] Inventor: Steve G. Grall, New Holstein, Wis.

[73] Assignee: Metko, Inc., New Holstein, Wis.

[21] Appl. No.: 487,000

[22] Filed: Apr. 21, 1983

[51] Int. Cl.$^4$ ............................................. B65G 21/00
[52] U.S. Cl. ................................... 198/861.2; 198/823
[58] Field of Search ............... 198/864, 823, 818, 313, 198/632, 525, 836, 636, 862, 861.1, 862.2

[56] References Cited

U.S. PATENT DOCUMENTS

| | | | |
|---|---|---|---|
| 793,557 | 6/1905 | Adams et al. | 198/861.2 |
| 2,373,839 | 4/1945 | Madeira | 198/861.2 |
| 2,925,053 | 2/1960 | Beaman | 198/823 X |
| 3,583,327 | 6/1971 | Arndt | 198/861.1 X |
| 3,828,916 | 8/1974 | Patz | 198/861.2 X |
| 3,876,060 | 4/1975 | Stease | 198/861.1 X |
| 4,261,460 | 4/1981 | Peterson | 198/861.1 X |

FOREIGN PATENT DOCUMENTS

| | | | |
|---|---|---|---|
| 1032171 | 6/1958 | Fed. Rep. of Germany ... | 198/861.2 |
| 2052419 | 1/1981 | United Kingdom | 198/313 |
| 2059900 | 4/1981 | United Kingdom | 198/836 |

Primary Examiner—Robert J. Spar
Assistant Examiner—Chryl L. Gastineau
Attorney, Agent, or Firm—Wheeler Law Firm

[57] ABSTRACT

Articulated decline belt conveyor in which the elbow is defined by a pair of rollers respectively attached to the joined sections of the frame for dividing the decline angle into two smaller parts. The belt is transversely troughed over much of its length, but is flattened by the pair of rollers defining the elbow, thereby permitting a more substantial decline angle than if the belt was transversely troughed while traversing the elbow. Improved structures for supporting the conveyor frame are also disclosed.

12 Claims, 2 Drawing Sheets

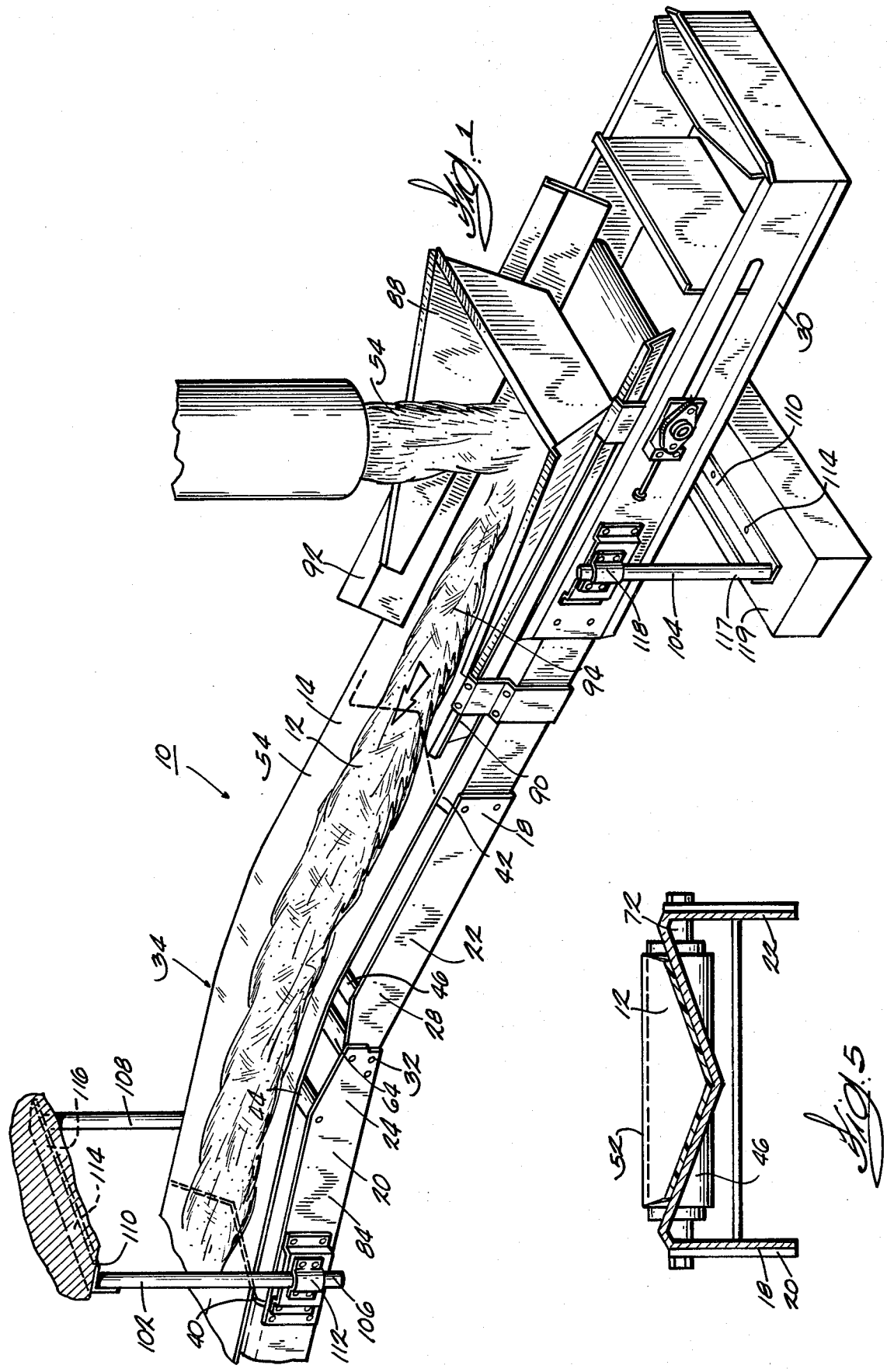

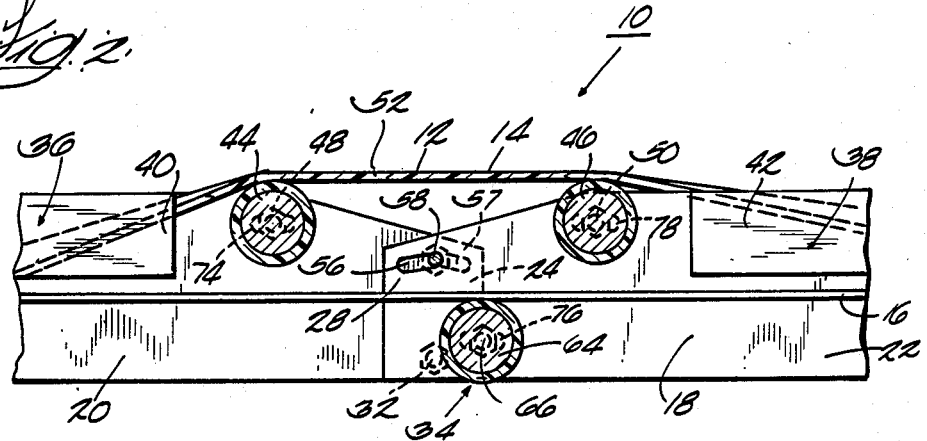

DECLINE BELT CONVEYOR

TECHNICAL FIELD

This invention relates to belt conveyors for bulk material, and particularly to conveyors for agricultural materials such as feed.

BACKGROUND OF THE INVENTION

Decline belt conveyors are endless conveyor belts carried on an articulated frame, at least one section of which can be pivoted about a transverse pivot to form an incline or decline (depending on the direction of belt travel) with respect to an adjacent section of the conveyor. While decline conveyors have been used to transport agricultural materials such as feed from a point of storage to feeding stations, prior decline conveyors have a serious problem.

At belt speeds typical in the art, such as about five feet per second, existing decline conveyors have tended to lose material from the portion of the belt passing over the elbow of the decline, particularly if the decline angle is substantial. When traversing the elbow of the conveyor, the material is thrown off the belt (or thrown upwardly and caught by the wind) if it fails to change direction at the elbow as suddenly as the belt does. This problem is not noted in chain conveyors, as shown in U.S. Pat. No. 3,828,916, issued to Patz on Aug. 13, 1974. In the chain drive devices of the latter patent a pintle chain slides agricultural material along a stationary bed embraced by substantial vertical sidewalls. If material is projected from the bed by the chain, which is unlikely, the sidewalls will confine the material until the same or another flight of the chain picks it up again. A chain, being jointed, can also be more flexible than a belt designed for comparable service. The commercial version of the Patz structure can only accommodate a 23 degree decline.

As a result of the difficulty in keeping feed on a single belt traversing a prior decline, such devices require severely restricted decline angles, reduced belt speeds, or high sidewalls. The alternative has been to provide two conveyors disposed at different angles, with one feeding the other, thus requiring two belts, two drives, and other expensive complications. The object realized by the present invention is to largely remove these disadvantages of prior decline belt conveyors.

SUMMARY OF THE INVENTION

The decline conveyor of the present invention comprises a single belt having a feed run and return run, an articulated frame, first and second troughed slides for supporting and cupping the portions of the feed run remote from the pivot, and at least a pair of rollers rotatably supported by the respective frame sections on either side of the pivot. The rollers are each disposed substantially above the frame pivot in the preferred embodiment of the invention.

A first advantage of this structure is that the permitted decline angle for a given rate of belt travel can be greatly increased, as the material of the belt is transported from the first conveyor to the second in two discrete steps as the belt sequentially traverses each roller of the pair. The rollers can thus have very small diameters, providing an elbow with a reduced profile or vertical height, as each change of direction of the belt and material is less than the net decline angle.

The invention has other advantages as well. The feed run, which is troughed except at the elbow, is flattened in the region traversing and between the rollers, enabling the belt to bend more sharply at each roller and therefore decreasing the longitudinal distance across the decline. Also, increasing the decline angle separates the pair of rollers, increasing the time allowed for feed to traverse the pair of rollers when the decline angle is large. Therefore, for large decline angles, if any material does hop above the belt after traversing one roller it has more time to resettle on the belt before traversing the other roller.

A commercial version of the present invention can accommodate a decline angle as large as 35 degrees without losing a substantial amount of material.

Other features and advantages of the invention will become apparent from the description and claims which follow.

BRIEF DESCRIPTION OF THE DRAWINGS

FIG. 1 is a perspective view of a decline conveyor according to the present invention.

FIG. 2 is a fragmentary side elevation, with parts in cross-section, of the elbow of the conveyor shown in FIG. 1.

FIG. 3 is similar to FIG. 2, but shows the frame sections disposed at a substantial decline angle.

FIG. 4 is a plan view taken from the perspective of line 4—4 of FIG. 3.

FIG. 5 is a transverse section taken along line 5—5 of FIG. 3, showing further details of its construction.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Decline conveyor 10 comprises a single, endless, longitudinally and transversely flexible belt 12 having a feed run 14 and a return run 16. Belt 12 is carried and driven by the usual end rollers (not shown in detail) in association with an articulated frame 18 comprising first and second sections 20 and 22, the former having a first end 24 and a second end (not shown), the latter having a first end 28 and a second end 30. The respective first ends 24 and 28 are joined at a pivot 32 defined by fasteners 33.

Frame sections 20 and 22 and pivot 32 define the legs and apex of an obtuse angle denoted as R in FIG. 3, which is the difference between 180 degrees and the decline angle D of the articulated frame 18. Thus, when decline angle D is zero degrees, as shown in FIG. 2, feed run 14 travels in a straight line across the elbow generally indicated at 34. As decline angle D become substantial, as shown by FIG. 3, feed run 14 changes inclination as a result of traversing elbow 34.

Frame sections 20 and 22 respectively include troughed slides 36 and 38 which support most of feed run 14. Because slides 36 and 38 are generally troughed or V-shaped, (see FIG. 5) they cup feed run 14 transversely, thereby increasing the capacity of the belt to carry feed and reducing the tendency of the feed to fall off the belt. Slides 36 and 38 respectively have first ends 40 and 42 and second ends not specifically illustrated in the figures.

Feed run 14 is supported and flattened while traversing elbow 34 by a pair of rollers 44 and 46, respectively attached near first end 24 of first section 20 and first end 28 of second section 22. Roller 44 turns about a first transverse axis generally indicated at 48, while roller 46 rotates about a second transverse axis denoted as 50. Because rollers 44 and 46 are generally cylindrical, rather than substantially crowned or concave, they define a generally flat portion 52 of feed run 14 between them which doesn't deviate substantially from a single plane. The portion of feed run 14 traversing pivot 32 should not be substantially cupped transversely, in contrast to the rest of feed run 14, because a belt which is substantially cupped transversely cannot simultaneously accommodate a small radius turn about a roller. The relatively small span between rollers 44 and 46 over which feed run 14 is flattened is not long enough or subject to sufficient vibration to pitch material transversely off the belt at typical belt speeds.

It is also important that at least a pair of rollers 44 and 46 are provided, as demonstrated in FIG. 3, instead of a single roller. The decline angle D is the sum of two smaller angles, E and F. Angle E is the partial decline angle experienced by material traversing roller 44, while angle F is the partial decline angle experienced by material traversing roller 46. Since portion 52 of the belt is substantially flat, any material which hops slightly above feed run 14 in the vicinity of roller 46 will be recovered and returned to the belt surface 52 before feed run 14 subsequently traverses roller 44. This is true whether the material is ascending or descending the elbow. The smaller angles E or F are, the less is the tendency of the material to leave the belt, even momentarily. If the material traversed decline angle D by passing over a single roller, the material would have a far more pronounced tendency to hop off the belt than when traversing either of rollers 44 and 46.

Another advantage of providing at least two rollers 44 and 46 for carrying feed run 14 over elbow 34 can be seen by comparing FIGS. 2 and 3. In FIG. 2, in which the decline angle is zero, rollers 44 and 46 are closer together than in FIG. 3, in which a substantial decline angle D is provided. Thus, for substantial decline angles flat portion 52 is elongated, providing a greater time for recovery of material 54 on the belt after traversing one roller and before traversing the other. It will be noted that pivot 32 is vertically beneath and longitudinally between the first and second axes on which rollers 44 and 46 rotate. The greater the vertical distance between pivot 32 and a line joining first and second axes 48 and 50, the more axes 48 and 50 will separate as angle D is increased. Pivot 32 is therefore near the bottom of frame 18 while rollers 44 and 46 are disposed with their axes near the top of frame 18.

While in the preferred embodiment first and second axes 48 and 50 are equally distant from pivot 32 (both vertically and longitudinally) when the decline angle is zero as shown in FIG. 2, and angles E and F are preferably equal for any value of D, an unsymmetrical structure is also within the scope of the present invention.

In the illustrated embodiments the first ends 24 and 28 of the sections of frame 18 overlap, end 24 is provided with slot 56, and end 28 is provided with an overlapping slot 57. Slots 56 and 57 receive a fastener 58, here a threaded nut and bolt. A fastener and pair of slots are provided on each side of the frame. When fasteners such as 58 are loosened, one of sections 20 and 22 can be pivoted to change the decline angle. When fasteners such as 58 are tightened, the decline angle D will be set and first and second sections 20 and 22 will be substantially immovably secured. (It will be appreciated, however, that neither frame section is typically supported in its entirety by fasteners 58.)

Another preferred feature of the invention is at least one return roller 64 secured adjacent the first end 24 of first section 20 (or alternatively, adjacent the first end 28 of second section 22) for rotation about a third transverse axis 66 to guide return run 16 over pivot 32. This structure keeps return run 16 well within frame 18 for any decline angle. Only a single return roller 64 is required in the region of elbow 34.

Another feature of the illustrated embodiment, shown particularly in FIGS. 2 and 3, is roller trimming means for allowing each roller to be shifted slightly about a vertical axis perpendicular to transverse axes 48, 50 and 66. Such roller trimming means is provided by securing the stationary axles 68, 70, and 72 of rollers 44, 64, and 46 with their ends protruding through transversely registered pairs of longitudinally oriented slots such as 74, 76, and 78 passing through sidewalls 80, 82, 84 and 86 of sections 20 and 22. Either or both ends of each axle can be independently adjusted to trim the respective rollers, therefore correcting any tendency of belt 12 to move transversely off the rollers, due to inadvertent bending of frame 18 or other factors. While in the illustrated embodiment pivot 32 and axle 70 are noncollinear, in an alternate embodiment axle 70 could perform the function of pivot 32 as well.

Another preferred feature of the invention is illustrated in FIG. 1. Material 54 is fed onto a portion of feed run 14 corresponding to troughed slide 38; this process is assisted by hopper wall 88, which prevents overflow of material 54 as it is desposited on feed run 14. To further assist retention of material 54 on feed run 14 while traversing elbow 34, first and second converging plows 90 and 92 guide material 54, concentrating it transversing on a central region 94 of feed run 14 before feed run 14 traverses rollers 44 or 46. When concentrated, the material has less tendency to fall transversely from feed run 14 while traversing rollers 46 and 44.

Still another preferred feature of the invention, illustrated in FIG. 1, is a pair of support means 102 and 104. Each support means is generally U-shaped. Support means 102 has first and second parallel legs 106, 108 joined by a transversely disposed crossbar, here angle bar 110. Each leg such as 106 is temporarily secured by a clamp assembly 112 fixed to a sidewall 84 of frame section 20; clamp assembly 112 can be loosened to permit leg 106 to be adjusted for height or removed entirely for inversion, or can be tightened to fix leg 106 with respect to sidewall 84. Leg 108 is similarly and independently clamped to sidewall 80 of frame section 20. Angle bar 110 is provided with means such as apertures 114 for being secured to further support structure such as an overhead beam 116 of a building or the like. In support means 104, the U-shaped frame 117 is inverted in clamp assemblies such as 118, and angle bar 110 is supported (with or without secure attachment) to a support structure 119, which can be the ground or an elevating block. Because the respective legs of each U-shaped frame can be independently adjusted and because the frame can be inverted in the clamps, conveyor 10 can be supported on a flat or an irregular surface or suspended from an overhead support by a single type of easily erected support structure.

I claim:

1. A decline conveyor, comprising:
   A. a single, endless, longitudinally and transversely flexible belt having a feed run and a return run;
   B. an articulated frame comprising first and second sections, each having first and second ends, joined at their respective first ends by a transverse pivot, said frame sections and pivot defining the legs and apex of an obtuse angle which is the difference between 180 degrees and the decline angle of said frame;
   C. first and second troughed slides, respectively supported by said first and second frame sections, for supporting and imparting a troughed shape to corresponding portions of said feed run, said slides each having first and second ends; and
   D. at least a pair of rollers respectively secured to said first and second frame sections near their first ends for rotation about first and second transverse axes, said rollers supporting said belt and defining a generally flat portion of said belt between said rollers for traversing said pivot.

2. The decline conveyor of claim 1, wherein said pivot is disposed longitudinally between said first ends of said slides and each said roller is disposed longitudinally between said pivot and the first end of the slide for the corresponding frame section.

3. The decline conveyor of claim 2, wherein said pivot is disposed vertically beneath said first and second axes.

4. The decline conveyor of claim 3, wherein the rollers of said pair are positioned to move apart when said decline angle is increased by articulating said frame.

5. The decline conveyor of claim 1, wherein said first and second axes of rotation are substantially equally distant longitudinally and vertically from said pivot when said decline angle is zero degrees.

6. The decline conveyor of claim 1, further comprising means for normally securing said first and second frame sections immovably together to fix said decline angle.

7. The decline conveyor of claim 1, further comprising roller trimming means for shifting each roller slighting about a vertical axis perpendicular to its transverse axis.

8. The decline conveyor of claim 1, further comprising at least one return roller secured adjacent the first end of one said frame section for rotation about a third transverse axis to support said return run above said pivot.

9. The decline conveyor of claim 8, wherein said third transverse axis is vertically lower than said first and second axes and said return run is disposed beneath said feed run.

10. The decline conveyor of claim 8, wherein said first, second, and third transverse axes are each noncolinear with said pivot.

11. The decline conveyor of claim 1, wherein said feed run travels from said second frame section to said first frame section and said second frame section includes plow means for concentrating material carried by said feed run transversely on a central region of said feed run before said feed run traverses said pair of rollers, thereby preventing said material from falling transversely from said feed run while traversing said pair of rollers.

12. The decline conveyor of claim 1, including at least one support means for associating said frame with a support structure, said support means comprising a generally U-shaped frame having first and second parallel legs joined by a transversely disposed crossbar; first and second clamping means for clamping selected parts of the respective legs to said frame; and means for securing said crossbar to said support structure; said first and second clamping means being independently adjustable to shift said crossbar, accommodating irregularities of said support structure.

* * * * *